United States Patent

Pack et al.

[11] Patent Number: 5,551,525
[45] Date of Patent: Sep. 3, 1996

[54] CLIMBER ROBOT

[75] Inventors: Robert T. Pack; Moenes Z. Iskarous; Kazuhiko Kawamura, all of Nashville, Tenn.

[73] Assignee: Vanderbilt University, Nashville, Tenn.

[21] Appl. No.: 293,498

[22] Filed: Aug. 19, 1994

[51] Int. Cl.$^6$ ................................................. B62D 57/032
[52] U.S. Cl. ............................. 180/8.6; 180/901; 180/8.1
[58] Field of Search ............................. 180/901, 8.1, 8.6

[56] References Cited

U.S. PATENT DOCUMENTS

| | | | |
|---|---|---|---|
| 4,674,949 | 6/1987 | Kroczynski | 414/750 |
| 4,977,971 | 12/1990 | Crane, III et al. | 180/8.3 |
| 5,040,626 | 8/1991 | Paynter | 180/8.6 |
| 5,077,510 | 12/1991 | Collie | 318/568 |
| 5,121,805 | 6/1992 | Collie | 180/8.6 |
| 5,219,410 | 6/1993 | Garrel | 180/8.6 |
| 5,351,626 | 10/1994 | Yanagisawa | 180/8.6 |

FOREIGN PATENT DOCUMENTS 176869  9/1985  Japan ..................... 180/901

OTHER PUBLICATIONS

Bridgestone Corporation Literature entitled "Rubbertuator Kit Series" and SoftArm.
Wall-Climbing Robot for Inspection in Nuclear Power Plants, Briones, Bustamante and Serna.
Wall Climbing Robots for Aircraft . . . Bahr & Yin.
Development of a Self-Contained Wall-Robot, Ikeda & Nozaki.
Development of Wall-Climbing Robot, Nishi & Miyagi.
Automation for Destructive Inspection of Aircraft, Siegel.

*Primary Examiner*—Eric D. Culbreth
*Assistant Examiner*—F. Zeender
*Attorney, Agent, or Firm*—Waddey & Patterson; Mark J. Patterson

[57] ABSTRACT

A climber robot has front and rear legs joined together by a pivoting knee joint and having pivoting ankle joints at their distal ends. Pneumatic muscle pairs attached to each leg allow the robot to move vertically and horizontally and make easy transitions over obstacles and from the horizontal to vertical plane.

7 Claims, 12 Drawing Sheets

Rubbertuator Pneumatic Control Circuit

CLIMBER ROBOT

BACKGROUND OF THE INVENTION

The present invention relates generally to mobile robots and more particularly to robots capable of climbing and traversing horizontal, angled and vertical surfaces, including making transitions between the two. Such robots are used for remote inspection of bridges, aircraft, and other man-made structures.

There are two basic types of robots used in commercial applications today. The first, and most prevalent, is the industrial robot which, while confined to a relatively fixed position, employs various linear, rotary, and other actuators and effectors to position a limb for manipulating or performing work on an object, such as in a manufacturing assembly line. A second type of robot is the mobile robot which can propel itself to different locations, allowing it to perform remote sensing and inspection tasks on man-made structures, such as bridges, buildings, and aircraft. Some mobile robots are also used to deliver light payloads to almost any point on a structure.

Most mobile robots found in the prior art are limited to rolling or walking across a floor, on a flat surface. Some prior art mobile robots have been provided with climbing feet, giving the robot the capability of moving along a non-horizontal surface or, in some cases, enabling it to step over objects which may otherwise interfere with the path of the robot. For example, U.S. Pat. No. 4,674,949 discloses a robot having climbing feet, allowing it to move along a non-horizontal surface. Movement is effected by translation of a motorized slide while suction cups hold the robot in place and jacks elevate the slide. However, the movement described by the inventor of the '949 device would be virtually impossible if any reasonably sized object intervened.

In U.S. Pat. No. 4,977,971, a mobile robot is described in which four tracked "legs" are attached to a central body through multiple joints which allow the feet to pivot, tilt, and lift in three distinct movement modes. The '971 robot apparently can climb stairs and maneuver around obstacles but does not appear capable of climbing vertically or making an effective transition from, for example, floor to wall.

The four sided scaling robot described in U.S. Pat. No. 5,077,510 is a frame device which can climb vertical surfaces using suction cups. A single linear actuator produces movement. However, it does not appear that the '510 device can step over obstacles nor make an easy transition from horizontal to vertical travel.

Prior art wall climbing robots have typically been provided with linear screw actuators which produce leg extensions/contraction, a sideways motion, or leg rotation movements, to allow transition of the robot from a horizontal to vertical movement surface. The use of such actuators and motion results in a mobile robot which is heavy and unwieldy, thereby restricting its useful application.

What is needed, then, is a compact mobile robot which has multiple degrees of freedom of movement, which can move horizontally, climb vertical surfaces, and traverse obstacles, is relatively simple in its design and construction, and is both high in strength and low in weight. Such a robot is presently lacking in the prior art.

SUMMARY OF THE INVENTION

In accordance with the present invention, a climber robot is provided with a basic movement mechanism having two feet attached to front and rear ankles. The ankles are linked to the distal ends of opposed front and rear leg assemblies through front and rear pivoting ankle joint assembly. Each leg assembly has two pneumatic muscle pairs, oriented in parallel on a frame but capable of operating independently. The proximal ends of each leg assembly frame are joined to a common pivoting knee joint. The front and rear ankles are rigidly attached to surface engaging feet. The rear ankle joint assembly includes a miter-geared differential joint which enables rotation of the rear ankle and foot in two planes.

Air, power, and high level command signals are delivered to the robot movement mechanism using a tether. Using an on board microprocessor controlled air system, air is delivered to each pneumatic muscle to effect a change in position of the corresponding joint. The pneumatic muscles are not conventional pneumatic cylinders but, rather, rubberized actuators having a pneumatic cavity surrounded by an elastic tube. When the pneumatic cavity of the muscle is pressurized, the tube expands radially, causing a proportional linear contraction of the tube and muscle. Drive chains are attached to one end of each muscle. Linear expansion and contraction of the muscle causes the drive chain to produce a rotation or pivoting of the ankle about a pivoting shaft at the distal ends of the leg frames and a rotation of the knee joint at the proximal ends of the frames.

By pressurizing and de-pressurizing the pneumatic cavities of the muscles in response to position control and feedback signals, the climber robot can be instructed to lift a leg and foot over an obstacle, to engage a wall or surface at a ninety degree (90°) angle, or even to flip back over itself in a reverse direction. The feet of the robot can be provided with gripping-type end effectors or with an active suction system, enabling the robot to engage and hold on to a non-horizontal surface. By use of rubberized actuators as muscles for the legs, the climber robot is light in weight with a high power to weight ratio and, in comparison with conventional pneumatic actuators, position control of the robot is more easily achieved.

DESCRIPTION OF THE PREFERRED EMBODIMENT

Figure 8:
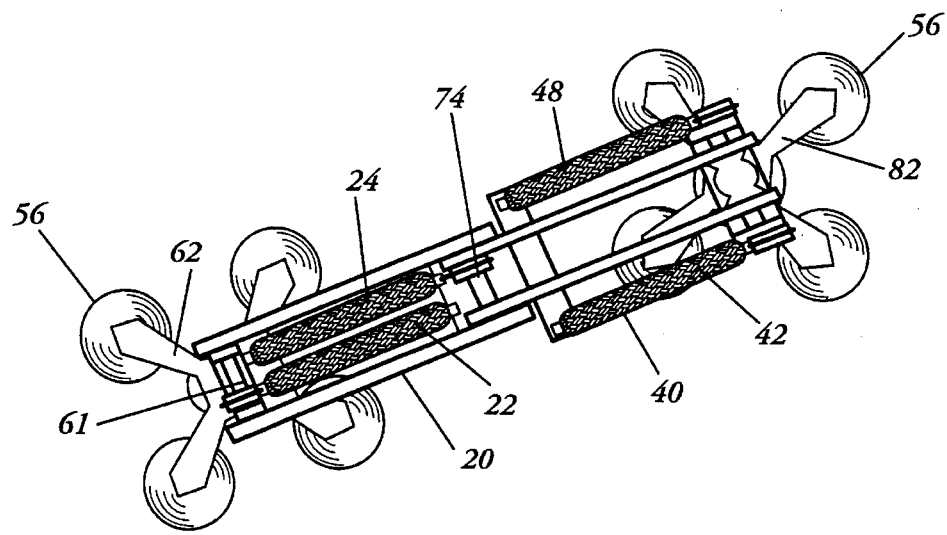
FIG. 8 is a top view of the climber robot movement mechanism.
Figure 1:
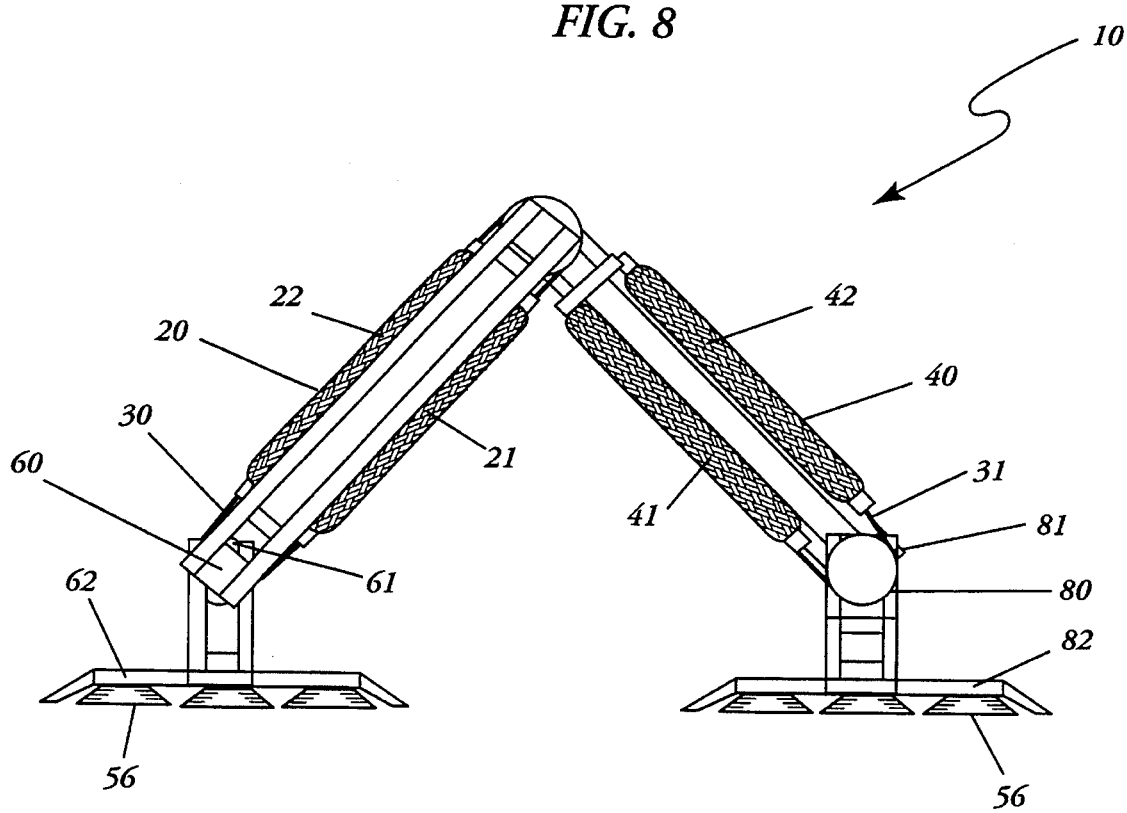
FIG. 1 is a side view of the climber robot movement mechanism.

Looking first at FIGS. 1, 2, 3, 8, 11 and 13, there is shown the movement mechanism 10 of the climber robot. A front leg assembly 20 is joined to a rear leg assembly 40 at their respective distal ends by knee joint 70. As shown in greater detail in FIGS. 2 and 3, front leg assembly 20 is equipped with two cooperating muscle pairs, lower and upper outside front leg muscles 21, 22 and lower and upper inside front leg muscles 23 (FIG. 13) and 24, positioned in substantial parallel alignment. A surface engaging front foot 62 is rigidly attached to a front ankle 60 which, in turn, is pivotally connected to front leg assembly 20 by means of front ankle differential joint 61 (FIG. 8).

Similarly, as seen on FIGS. 1, 4, 5, 8, 11 and 13, rear leg assembly 40 includes two cooperating muscle pairs, substantially parallel aligned, defined by lower and upper outside rear leg muscles 41, 42 and lower and upper inside rear leg muscles 47 (FIG. 13) and 48. A rear ankle differential joint assembly 81 pivotally attaches the distal end of rear leg assembly 40 to a rear ankle 80. A rear foot 82 is rigidly fixed to rear ankle 80.

Figure 13:
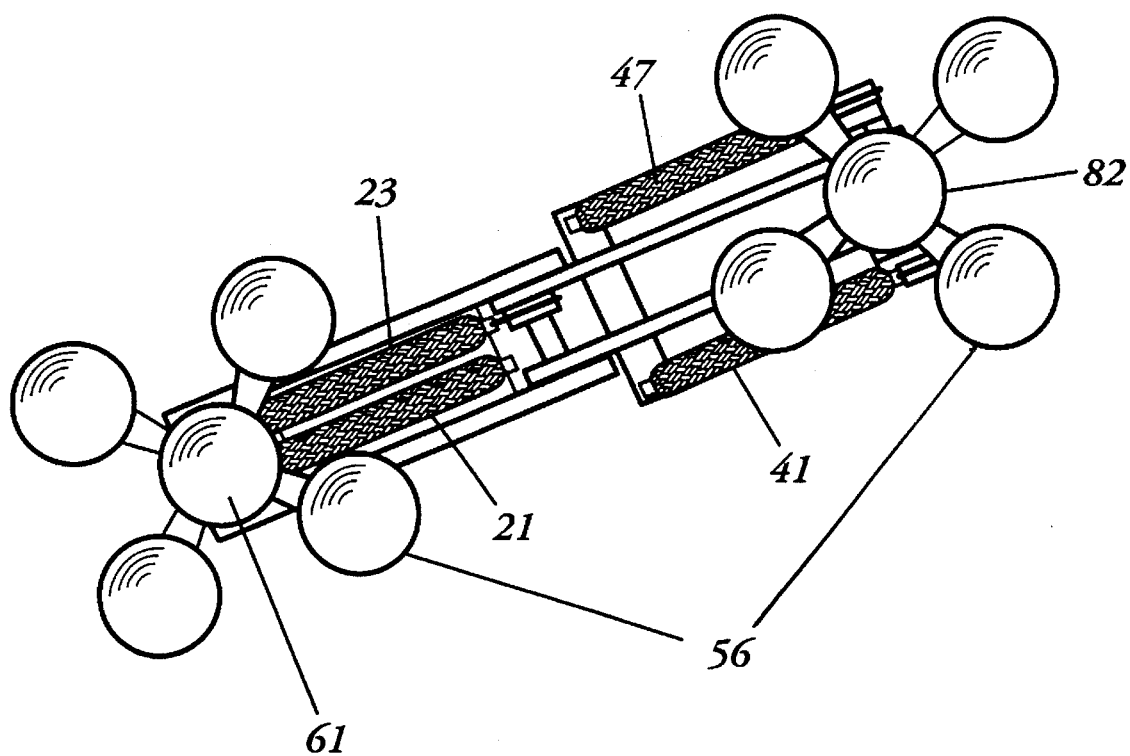
FIG. 13 is bottom view of the climber robot movement mechanism.

As best seen in FIG. 8 and FIG. 13, both front and rear feet 62 and 82 will preferably engage the ground through five suction cups 56 which are connected to an on board vacuum unit and vacuum control system (FIG. 15) for active application and removal of suction.

Figure 2:
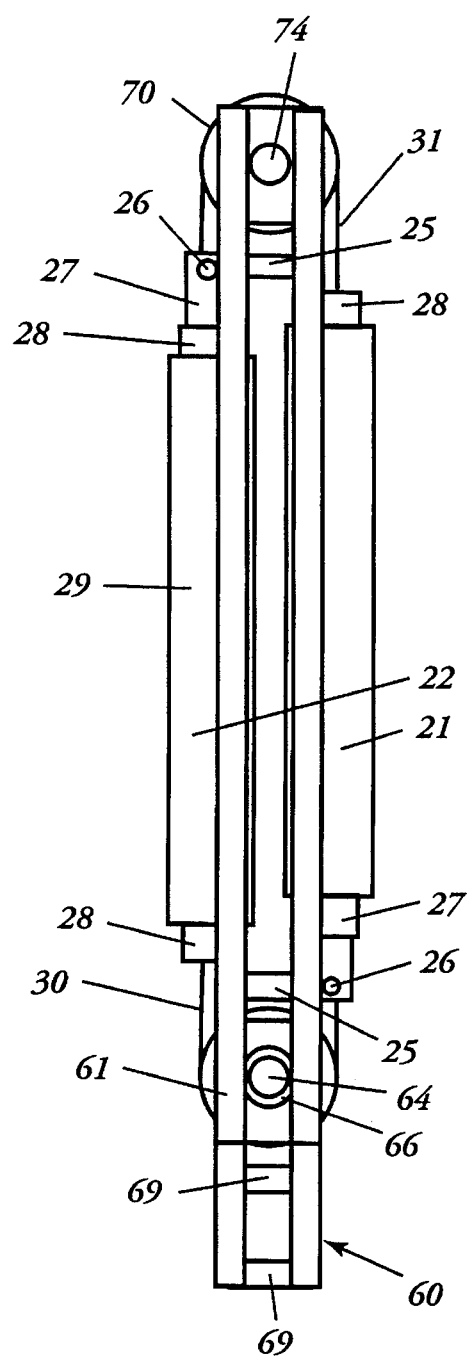
FIG. 2 is an enlarged side view of the front leg assembly of the climber robot movement mechanism.
Figure 3:
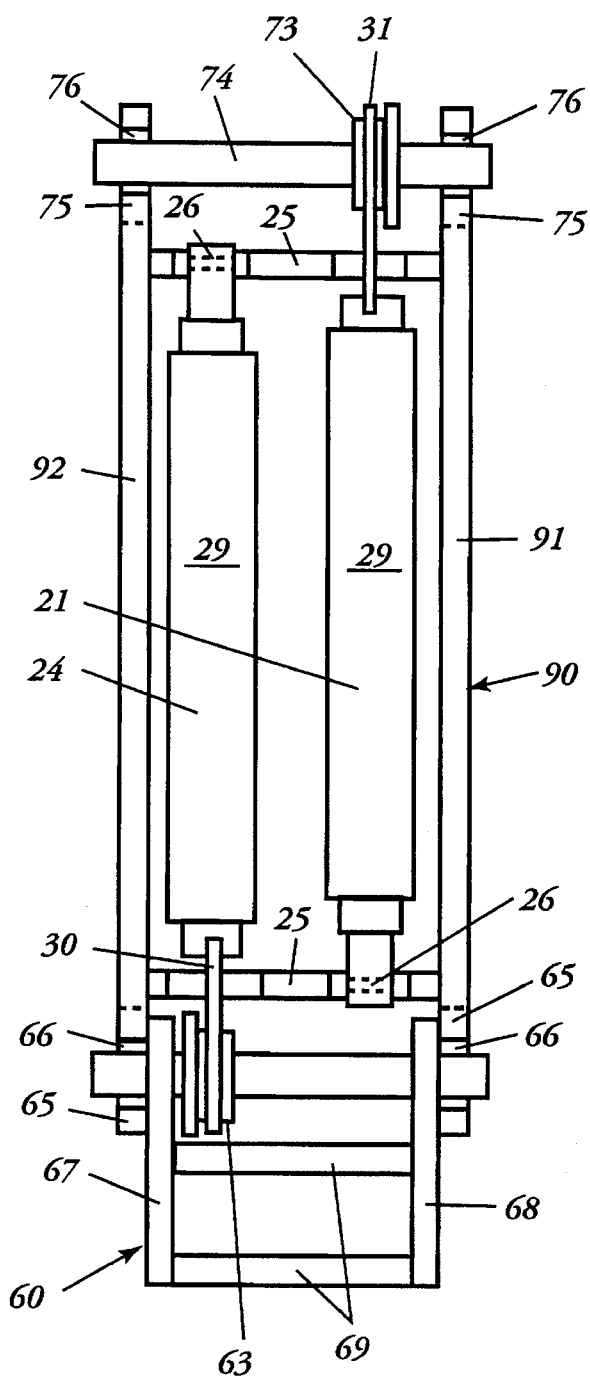
FIG. 3 is an enlarged top view of the front leg assembly of the climber robot movement mechanism.

FIGS. 2 and 3 are enlarged side and top views of front leg assembly 20 of movement mechanism 10. A front leg frame 90 is constructed of inside and outside front leg side members 91 and 92, preferably made of lightweight aluminum. Muscle mounting flanges 25 are attached transversely between frame side members 91 and 92 near the proximal and distal ends of frame 90. Attached to the distal end of front leg frame 90 is front ankle 60. Inside ankle plate 67 and outside ankle plate 68 of ankle 60 are joined by transversely mounted blocks 69 such that ankle plates 67 and 68 are substantially parallel aligned, with their respective proximal outside surfaces aligned with but slightly separated from corresponding distal inside surfaces of outside and inside front leg members 91 and 92. A front ankle joint shaft 64 passes through inside front leg member 92, inside ankle plate 67, outside ankle plate 68, and outside front leg frame member 92. Front ankle joint shaft beating blocks 65 and shaft bearings 66 secure front ankle joint shaft 64 in a manner whereby front ankle 60 can freely pivot both above and below the horizontal plane defined by front leg frame 90. A front ankle drive gear 63 is fixed to front ankle joint shaft 64 proximate the distal ends of upper and lower inside front leg muscles 24, 23. A front ankle drive chain 30 is connected to the distal ends of upper and lower inside muscles 24, 23, wrapping around and operably engaging the teeth of front ankle drive gear 63.

The proximal ends of upper and lower outside muscles 24, 23 are attached to knee joint drive chain 31 engages the teeth of knee joint drive gear 73. The proximal ends of muscles 24, 23 and distal ends of muscles 21, 22 are secured to mounting flanges 25 by pins 26.

Figure 4:
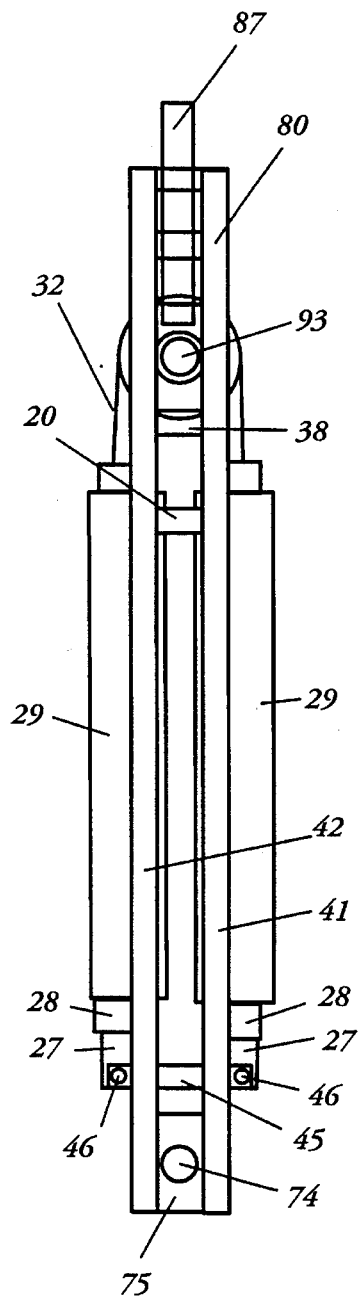
FIG. 4 is an enlarged side view of the rear leg assembly of the climber robot movement mechanism.
Figure 5:
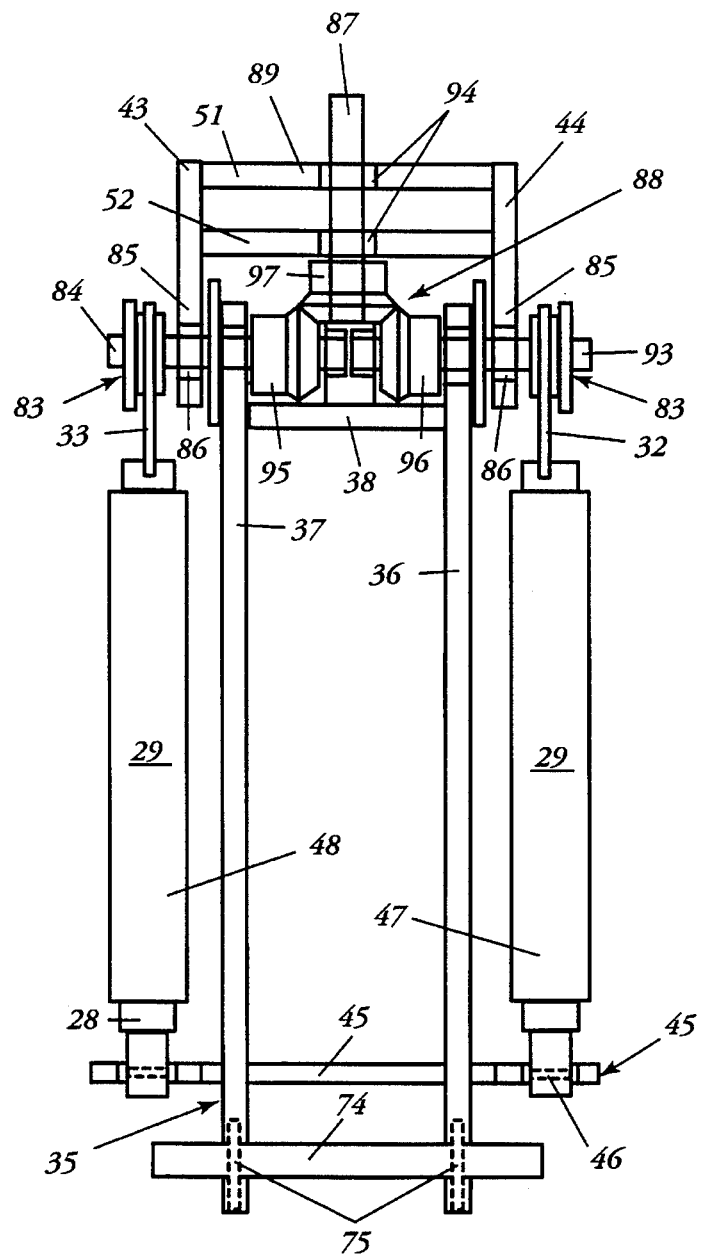
FIG. 5 is an enlarged top view of the rear leg assembly of the climber robot movement mechanism.

Looking now at FIGS. 4 and 5, further detail is shown of rear leg assembly 40, rear ankle 80, rear ankle differential joint assembly 81 and knee joint 70. Rear leg frame 35 is formed by inside and outside rear leg frame side members 37, 36, transversely fixed muscle mounting flange 45, and cross member 38. Lower outside rear leg muscle 41 and upper outside rear leg muscle 42 are attached at their proximal ends to mounting flange 45 by pins 46 and are positioned in substantial parallel alignment with and outside of frame side members 36 and 37. Knee joint shaft 74 is secured to the proximal ends of frame members 36 and 37 by means of knee shaft mounting blocks 75.

Attached at the distal end of rear leg assembly 40 is differential joint assembly 81 which rotatably secures rear ankle 80 to frame 35. Ankle 80 includes outside ankle plate 44 and inside ankle plate 43, connected by transversely mounted first and second differential shaft flanges 51 and 52. Rotatably positioned between the inner facing surfaces of the distal portions of inside and outside rear leg frame side members 37 and 36, is a differential joint miter gear assembly 88. As seen on FIG. 5, assembly 88 includes an inner half shaft 84 which extends through the proximal end of rear inside ankle plate 43 and the distal end of outside rear leg frame side member 37, and is attached to inside miter gear 95. Similarly, outer half shaft 93 passes through outside rear ankle plate 44 at its proximal end, through outside rear leg frame side member 36 at its distal end, and is attached to and disposed centrally through outside miter gear 96. Half shafts 84 and 93 are rotatably secured within ankle plates 43 and 44 respectively by means of conventional shaft bearings 86 mounted in beating blocks 85. A differential drive gear 83 is mounted to each of half shafts 84 and 93, proximate to the outer surfaces of plates 43 and 44. An inside rear ankle drive chain 33 is connected to the distal ends of muscles 48 and 47 (FIG. 11), operably engaging therebetween the teeth of inside drive gear 84. Outside rear ankle drive chain 32 is attached to the distal ends of rear leg muscles 42 and 41, passing over and engaging outside drive gear 83. Pins 46 fix the proximal ends of muscles 41, 42, 47, 48 to flange 45.

In a conventional manner, the teeth of central miter gear 97 operably engage the distal beveled teeth of inside and outside miter gears 95 and 96. Transverse miter gear 97 is attached to the proximal end of rear axle differential shaft 87 which rotatably passes through first and second flanges 51 and 52, secured by shaft bearings 94 within bearing blocks 89. The distal end of shaft 87 is attached to rear foot 82.

The proximal ends of front leg assembly 20 and rear leg assembly 40 are pivotally attached by knee joint 70. As best seen on FIGS. 3 and 5, knee joint shaft 74 is rotatably secured through the proximal ends of front leg frame side members 91 and 92, by means of bearings 76 supported in bearing blocks 75. Shaft 74 passes through and is fixed at the proximal ends of rear leg frame side members 36, 37 whereby the outer surfaces of rear leg side members 36 and 37 are aligned with and proximate to the inner surfaces of front leg side members 91, 92.

Figure 12A:
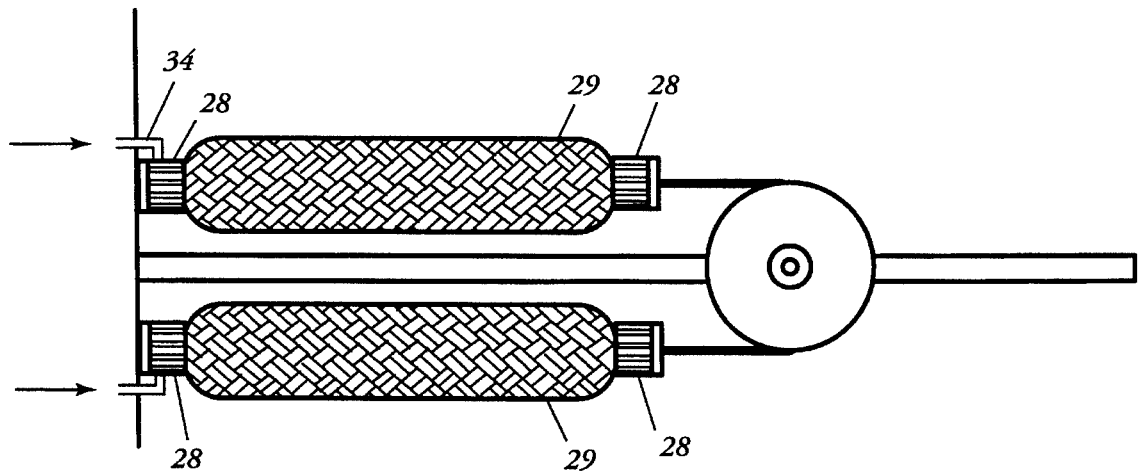
FIG. 12a is a side view of a leg muscle of the climber robot in a de-pressurized state.
Figure 12B:
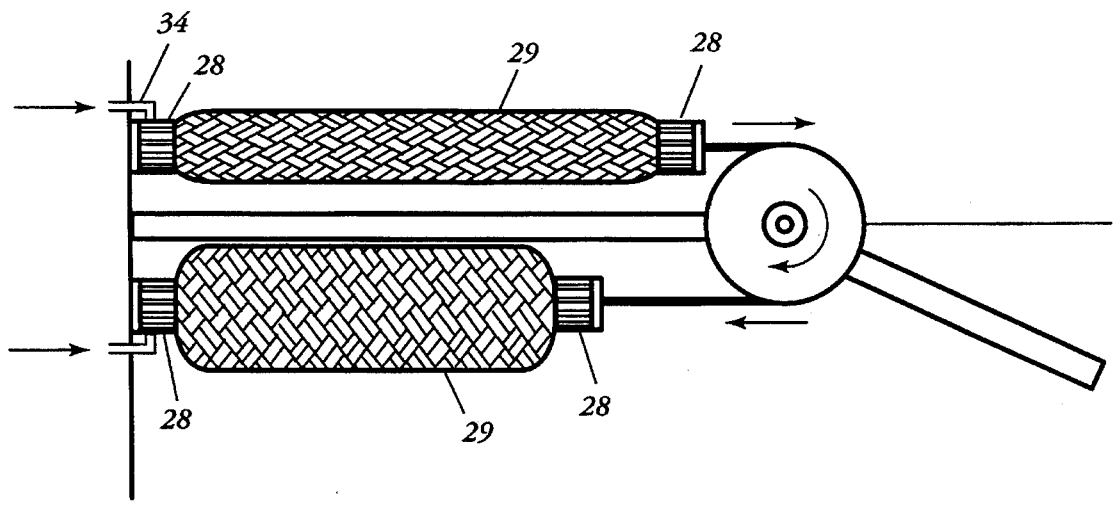
FIG. 12b is a side view of a leg muscle in a pressurized state.

Greater detail about the structure and basic functioning of each of leg muscles 21, 22, 23, 24, 41, 42, 47, and 48 is shown in FIGS 12a and 12b. Each leg muscle comprises an elongated elastic tube 29, preferable made of a rubber tube surrounded by a sleeve of diagonally intertwined fiber cord. Each end of tube 29 is mechanically and pneumatically sealed by means of circular fittings 28, defining within tube 29 a pneumatic cavity. Attached to fitting 28 at one end of each muscle is a rod 27 which includes an opening therein for insertion of a locking pin 26 (FIG. 2) or 46 (FIG. 4) to allow the fixed end of the muscle to be attached to its corresponding muscle mounting flange 25 or 45.

Air is delivered to and evacuated from the pneumatic cavity defined by elastic tube 29 by means of pressure fitting 34. In accordance with the preferred operation of the muscle, when the pneumatic cavity defined by elastic tube 29 is pressurized, tube 29 expands radially and at the same time contracts in a longitudinal direction, due to the force conversion occurring in the diagonally woven cord fabric of tube 29. When tube 29 of one muscle in each muscle pair contracts, the opposed muscle in the pair is depressurized and expands longitudinally. As a result, the corresponding drive chain 30, 31, 32, or 33 is pulled longitudinally in the direction of contraction, thereby rotating the drive gear to which the drive chain is attached. Further, as can be seen on FIG. 5, drive gears 83 on differential joint assembly 88 can be rotated independently or together, causing in the former mode the rotation of shaft 87.

Figure 6:
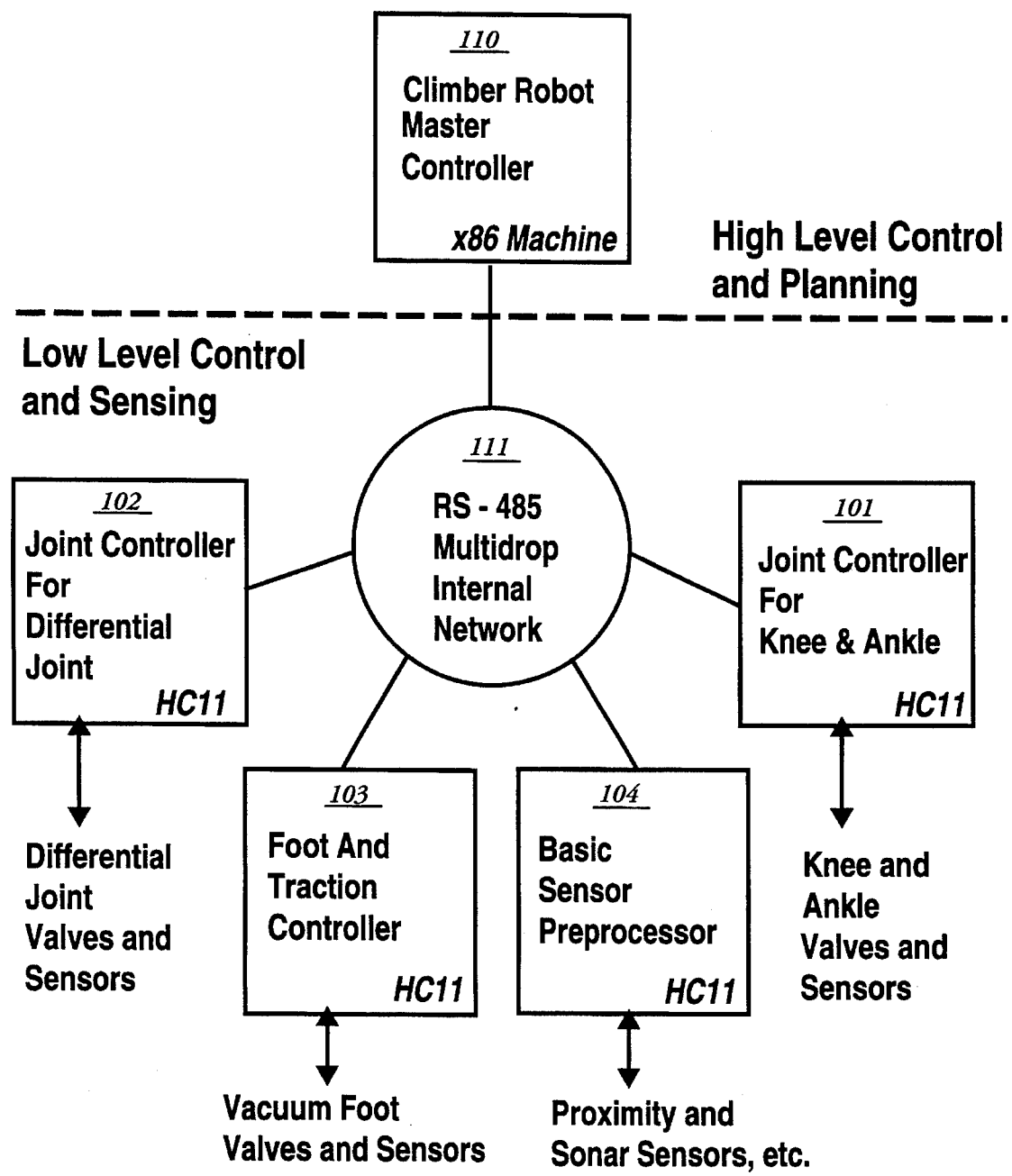
FIG. 6 is a block diagram schematic of the control system for the climber robot.

Preferably, pressurization and de-pressurization of the muscles of the climber robot is induced by an air supply which is external to climbing mechanism 10 but which is controlled on board. In accordance with this objective, a control system 100 for the climber robot is shown in FIG. 6. The basic operations of the climber robot (walk, step over an object, make transition, climb, position sensing, traction control) are preprogrammed in a series of instructions stored in a master control computer 110 which distributes the control commands by means of a conventional RS-485 multidrop network interface 111. In this illustration, control system 100 is shown operably connected to a first joint controller 101, for controlling operation of front ankle joint 60 and knee joint 70, and to a second joint controller 102, for control of rear ankle differential joint 81. A third controller 103 is used to control traction of the robot by active application and removal of suction to suction cups 56 of feet 62 and 82. Finally, master control computer 110 also communicates with a fourth controller 104, through network interface 111. Controller 104 provides distance and proximity information needed by master control computer 110 to determine if the robot has hit an object or engaged a surface. Each controller 101–104 forms a closed loop system whereby position and pressure sensors as described below provide feedback to a microprocessor where adjustments to joint control signals are then made.

Figure 7:
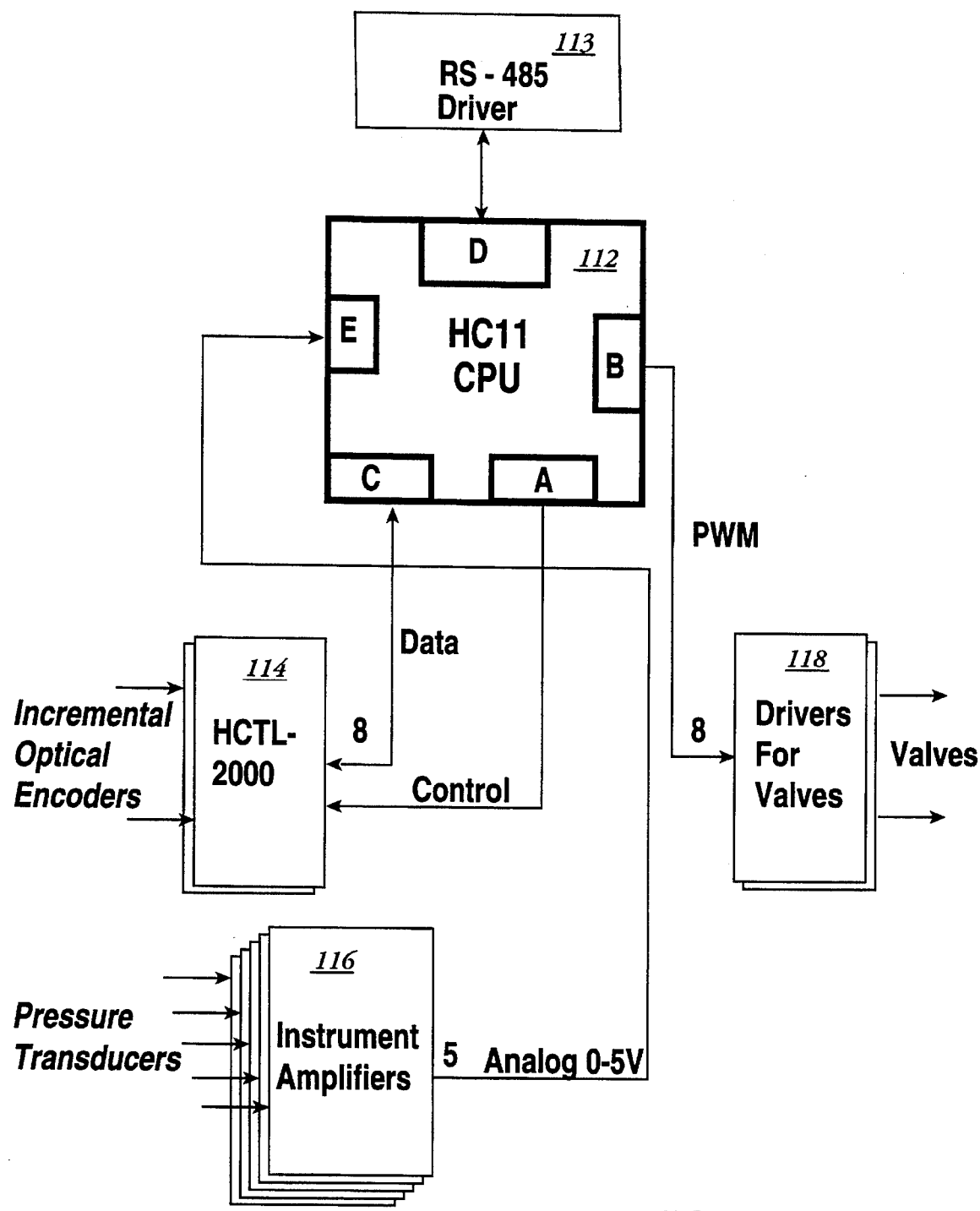
FIG. 7 is a block diagram schematic representation of a joint controller board of the climber robot control system illustrated in FIG. 6., for control of two joints.

In FIG. 7, a block diagram of a joint controller (101 or 102 of FIG. 6) is shown. The heart of the controller is an industry standard MC68HC11 CPU 112. CPU 112 communicates with network 111 through an RS-485 driver 113 connected to serial port D. Incremental optical encoders 54 (FIG. 11) of conventional design are positioned at each moving joint to determine both the relative position of the rotating or pivoting joint components as well as the direction of movement. A preferred technique for accomplishing this is to select and arrange the encoders 54, in a manner known to those skilled in the art, to provide A-phase, B-phase, and Z-phase position signals to position encoder circuit 114 which preferably is an industry standard HCTL-2000 IC chip. The A-phase and B-phase encoder signals are 90 degrees out of phase. The Z-phase signal establishes the "0 point", that is, the starting position for the joint, from where encoder circuit 114 begins counting movement indicating pulses generated by the incremental encoders 54 and associated with the A and B phase signals. This combination of signals allows encoder circuit 114 to determine the absolute position of the joint and communicate this to CPU 112. Preferably, the combination of the incremental optical encoders 54 with encoder circuit 114 and CPU 112 will provide 0.1 degree accuracy using 12-bit resolution. Encoder circuit 114 sends and receives data to and from CPU 112 via input/output port C and receives control signals from CPU 112 through output port A.

The data from the encoders 54 is used by CPU 112 to generate an error signal, representing the difference between the desired position of the joint in question and the absolute position which is calculated from the encoder data. This error signal, in turn, is used by CPU 112 to adjust the air pressure applied to the muscles which control the joint.

Figure 14:
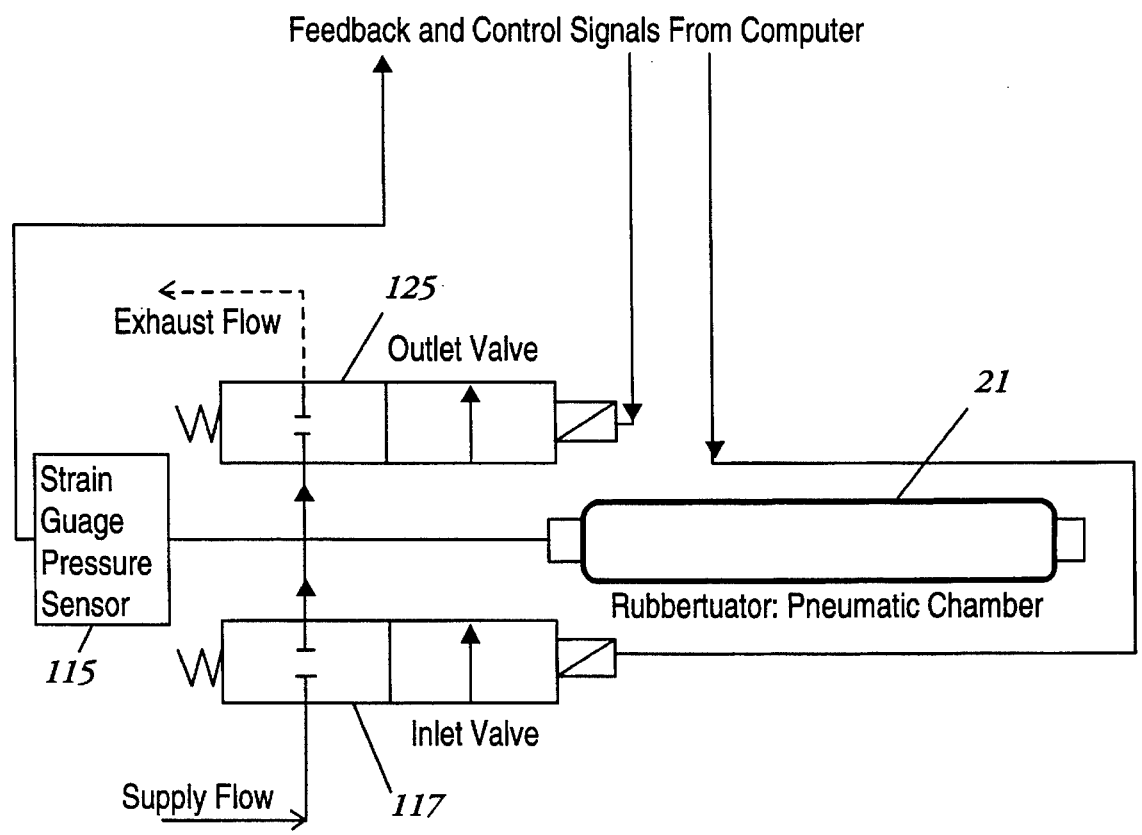
FIG. 14 schematically illustrates the control system components associated with each individual muscle.

FIG. 14 schematically illustrates the control mechanism for each individual muscle. A conventional strain gauge type pressure sensor 115 is located in the air line which connect the air exhaust valve 125 and air supply valve 117 to muscle 21 for example. Sensor 115 provides a constant analog signal which is proportional to the pressure applied to the pneumatic muscles.

Figure 15:
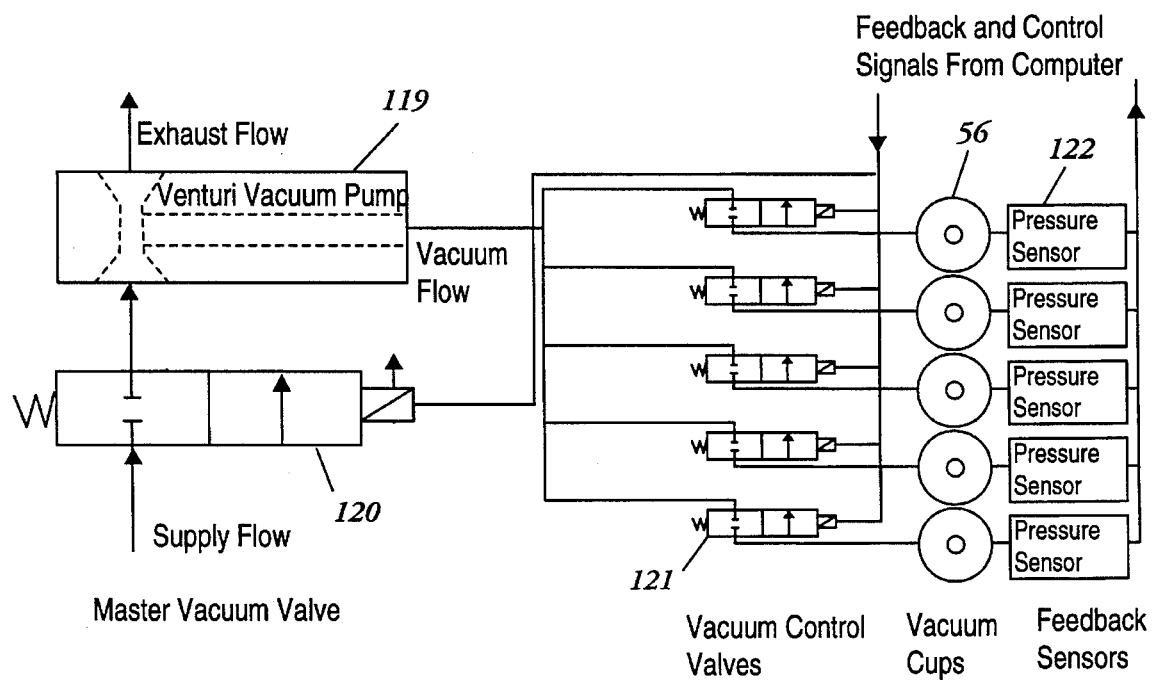
FIG. 15 schematically illustrates the vacuum control system components associated with the four suction cups mounted on each foot.

A vacuum control system is preferably provided for application and removal of suction to each suction cup 56 on front and rear feet 62 and 82, as shown in FIG. 15. A venturi vacuum pump 119 with integral exhaust valve is pneumatically connected to each suction cup 56 through control valves 121. A master vacuum valve 120 controls the supply of air to pump unit 119. A pressure sensor 122 is connected to each suction cup 56 so that feedback can be supplied to foot traction controller 103.

Signals from each pressure sensors 115 and 122 are buffered, filtered, and amplified in instrument amplifiers 116 so that the analog pressure signals provided to port E of CPU 112 are in the range of 0 to 5 volts. Port E includes an analog to digital converter so that the data supplied to CPU 112, representing the muscle air pressure and foot suction pressure, is digitized. Preferably, eight bits of resolution will be available for the digitized pressure data. The control system 100 constantly monitors and adjusts pressure to minimize unnecessary gross movements of the robot elements.

The pressure data supplied by instrument amplifiers 116 to CPU 112 is used to modulate the width of pulses generated by CPU 112 at output port B. This pulse width modulated signal is then sent to valve drivers 118 for purposes of determining whether air should be added to the corresponding muscle to increase the pressure, or exhausted to the atmosphere in order to decrease the pressure. Identical parallel set of air flow components, including conventional air supply and exhaust valves (117 and 125 on FIG. 14), will be electrically connected to drivers 118 so that independent operation of each muscle is obtained. Similar control signals are sent to vacuum pump 119, master vacuum valve 120, and vacuum control valves 121 (FIG. 15) to allow proper operation of foot suction during climbing maneuvers.

Figure 9A:
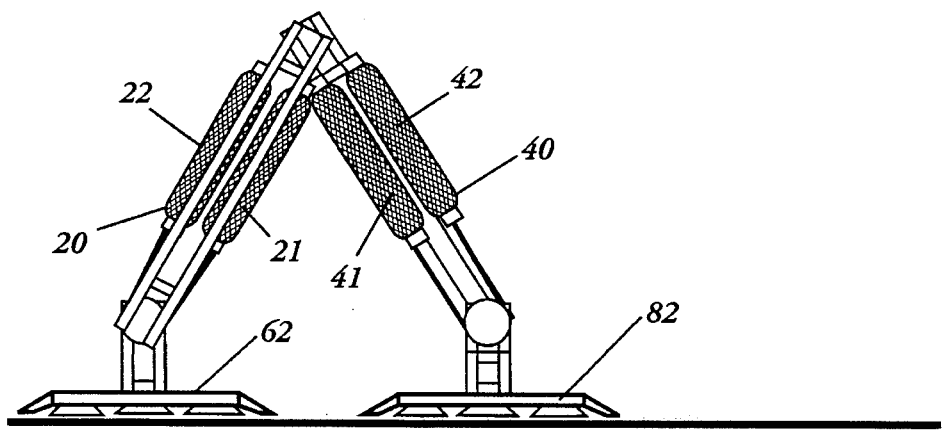
FIGS. 9a–d illustrate the movement of the climber robot along a horizontal surface, further showing the associated expansion and contraction of the pneumatic leg muscles to produce such movement.
Figure 9B:
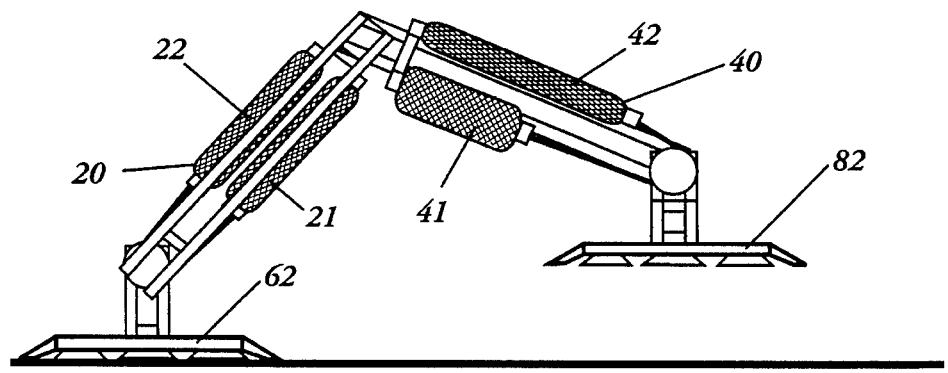
Figure 9C:
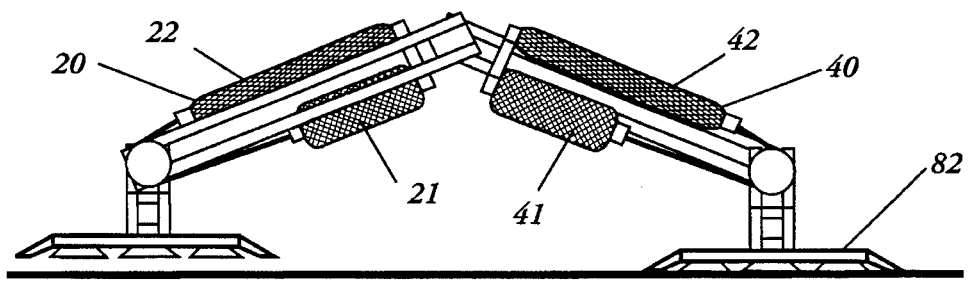
Figure 9D:
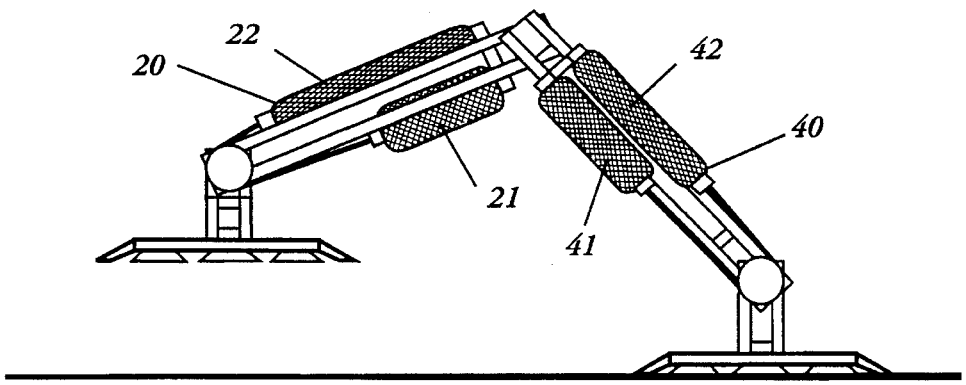
Figure 10A:
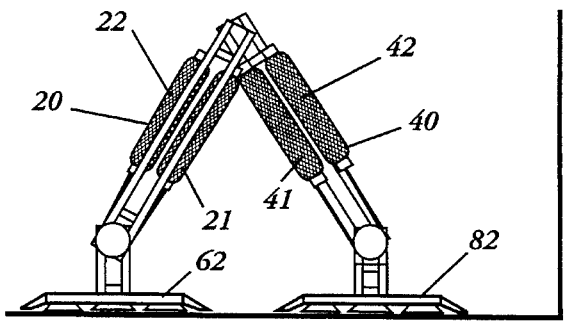
FIGS. 10a–e illustrate transition of the climber robot from a horizontal to vertical surface, further showing the associated contraction and expansion of the pneumatic leg muscles to produce such movement.
Figure 10B:
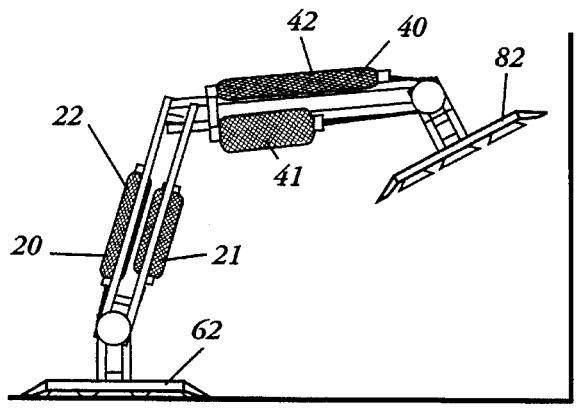
Figure 10C:
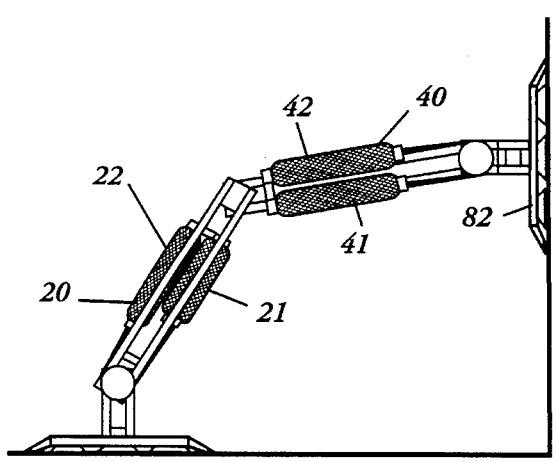
Figure 10D:
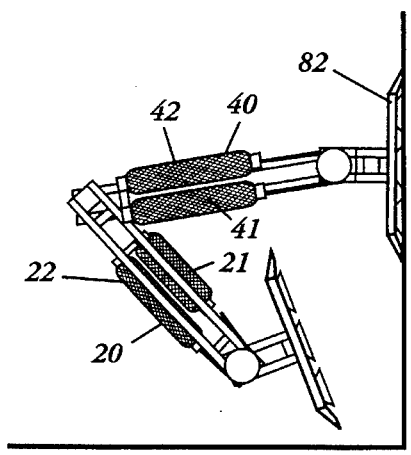
Figure 10E:
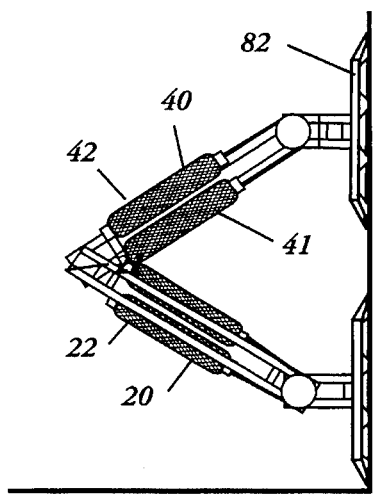
Figure 11:
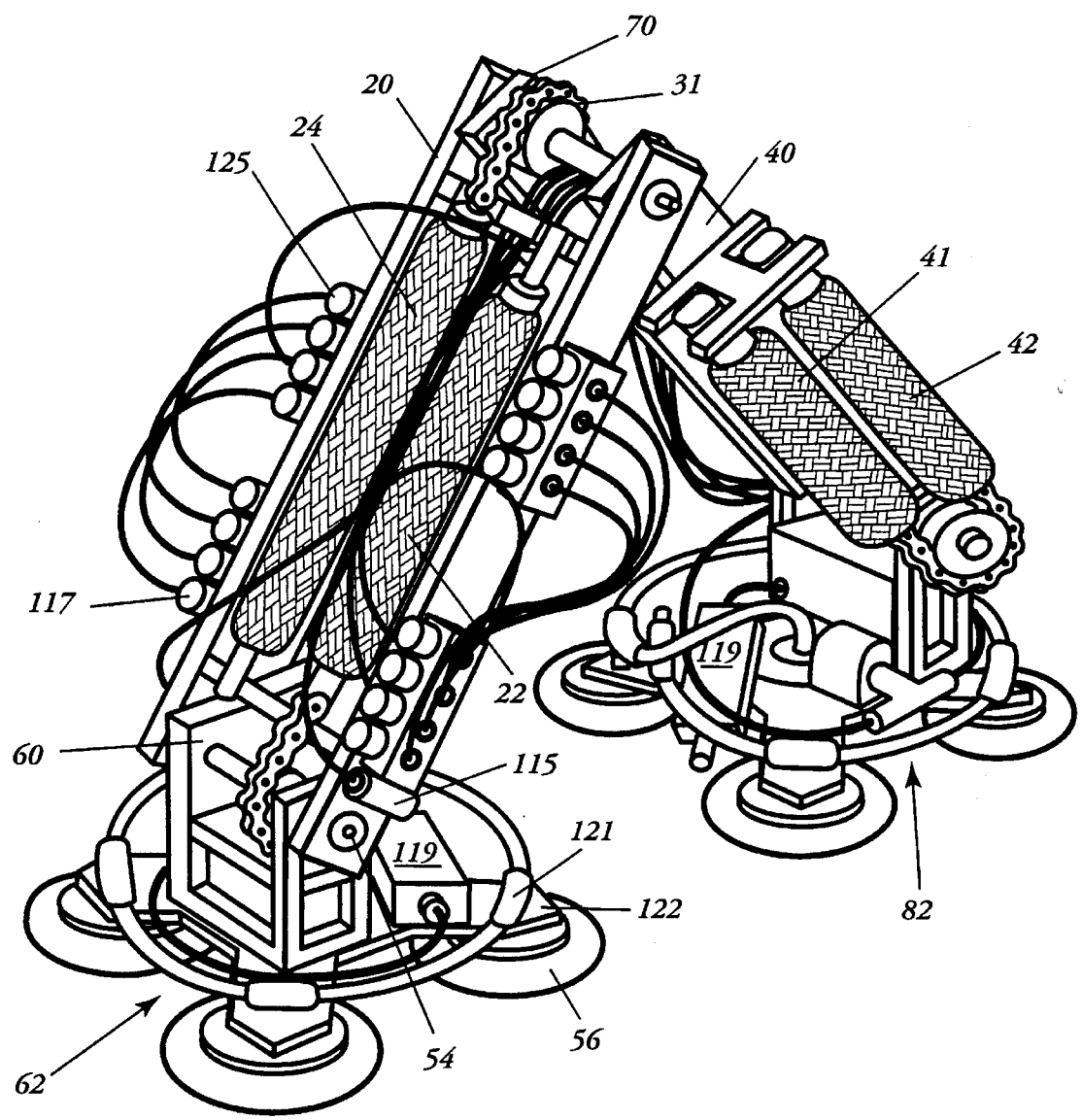
FIG. 11 is an isometric view of the climber robot.

It will be apparent to those skilled in the art that a similar closed loop control scheme will be used for adding or removing suction from suction cups 56 to purposes of pressure and traction control with one objective being minimizing the activity of the venturi pumps (119 on FIG. 15) which create the suction. Using the mechanical and electronic assemblies as described above, a preferred embodiment of the climber robot will then have four articulated degrees of freedom. FIGS. 9a, 9b, 9c, and 9d illustrate the walking motion of the climber robot along a horizontal surface, including corresponding expansion and contraction of the front and rear leg muscles to produce each movement. Thus, in FIG. 9a, all muscles are at standard pressure with the climber robot in a relaxed position. FIGS. 9b, 9c, and 9d show the sequential increased or decreased pressurization of muscles 21, 22, 41, and 42 as rear leg assembly 40 is lifted off the ground and moved forward. This is followed by the lifting of front leg assembly 20 whereby it is moved in closer proximity to rear leg 40 to prepare for the next walking step. It should be noted that master control computer 110 sends out instructions for determining the next desired absolute position of feet 82 or 62. That absolute position information is then used by corresponding CPU 112 of the joint controller 101 or 102 which then, as described above, receives position indicating signals from the encoders 54 through encoder circuit 114. Constant pressure adjustments are then made to minimize the difference between the desired position and the calculated position. At the same time, foot and traction controller 103 of control system 100 (FIG. 6) is receiving and sending pressure and suction control information to vacuum control system components (FIG. 15) associated with suction cups 56 of front and rear feet 62 and 82.

FIGS. 10a through 10e illustrate the transition of the climber robot 10 from a horizontal to vertical surface, further showing the associated expansion and contraction of the various muscles of the front and rear legs. As can be seen particularly in FIGS. 10b, 10c, and 10d, movement of front and rear ankle joints 60 and 80 is also effected during this transition. It will be apparent to those skilled in the art that suction control at front and rear feet 62 and 82 is also used so that the climber robot can maintain a position on the vertical surface.

Although not illustrated in this embodiment, the climber robot could further be provided with the ability to rotate at knee joint 70 if desired. Also, although the preferred embodiment of the present invention will have two muscles working together to control a joint, a spring or similar mechanical device could be used in place of one of the muscles in the pair. In either case, an important feature of the present invention is that the muscle movement is not sequential or pre-patterned. Rather, movement is controlled by a closed loop system whereby constant feedback from the environment surrounding the climber robot is obtained and used.

Preferably, Rubbertuator™ artificial muscles from Bridgestone Corporation can be used as the muscles of the climber robot, with corresponding servo valve and servo drive units.

Thus, although there have been described particular embodiments of the present invention of a new and useful climber robot, it is not intended that such references be construed as limitations upon the scope of this invention except as set forth in the following claims.

What is claimed is:

1. A mobile robot adapted for movement and climbing on horizontal and vertical surfaces comprising:
   a. a movement mechanism having a front leg assembly and a rear leg assembly, a front ankle pivotally attached to a distal end of said front leg assembly, a rear ankle pivotally attached to a distal end of said rear leg assembly, and said front and rear leg assemblies pivotally joined at their proximal ends by a knee joint;
   b. at least one pair of front leg pneumatic muscles mounted to said front leg assembly and operably attached to said knee joint and to said front ankle;
   c. at least one pair of rear leg pneumatic muscles mounted to said rear leg and operably attached to said rear ankle;
   d. each of said pneumatic muscles comprising a pneumatic cavity within an elastic tube, said tube having an opening therein for delivering and releasing air from said cavity, said tube defining a cylinder having a circumference and length, and whereby said circumference increases in proportion to an increase in air pressure within said cavity and whereby said length decreases in proportion to said increase in said circumference;
   e. said front leg muscles operably connected in a cooperative relationship whereby said front ankle can be pivoted above and below a horizontal plane defined by said front leg assembly and whereby said front leg can be pivoted about said knee joint above and below a horizontal plane defined by said rear leg assembly;
   f. said rear leg muscles operably connected in a cooperative relationship whereby said rear ankle can be pivoted above and below a horizontal plane defined by said rear leg assembly; and
   g. a front foot attached to said front ankle and a rear foot attached to said rear ankle, said front foot and said rear foot adapted for releasably engaging horizontal and vertical surfaces.

2. The robot of claim 1 further comprising traction means attached to said front foot and to said rear foot.

3. The robot of claim 2 further comprising a control system means for controlling movement of said front leg assembly, said rear leg assembly, said front ankle, and said rear ankle, by pressurization and de-pressurization of said muscles.

4. The robot of claim 3 wherein said control system means comprises joint position indicating means for indicating a position of said knee joint, muscle pressure sensing means for sensing pressure inside said pneumatic cavity, and muscle pressure adjustment means for varying the pressure inside said pneumatic cavity.

5. A climber robot comprising:
   a. front leg and rear leg each having a proximal end, the front leg and rear leg directly pivotally connected at their respective proximal ends by a knee joint;
   b. a front ankle pivotally connecting a front foot to a distal end of said front leg;
   c. a rear ankle pivotally connecting a rear foot to a distal end of said rear leg;
   d. leg movement means to pivot said front leg with respect to said rear leg whereby said front leg and said rear leg can be lifted off of a horizontal or a vertical surface and whereby said front leg and said rear leg can be moved toward and away from each other in a walking motion; and
   e. front foot pivot movement means to pivot said front foot with respect to said front leg and rear foot pivot means to pivot said rear foot with respect to said rear leg, said front foot pivot means including a front ankle drive means attached to said front ankle, and said rear foot pivot means including a rear ankle drive means attached to said rear ankle, whereby said robot can engage and move from a horizontal surface to a vertical surface.

6. The climber robot of claim 5 further comprising foot rotation means for rotating at least one of said rear foot and said front foot.

7. The climber robot of claim 6 where said leg movement means, each of said front and rear foot pivot movement means, and said foot rotation means, each comprise pneumatic muscles.

* * * * *